Oct. 19, 1943.                C. J. MANNEY                2,332,389
                               HOOK BLOCK
                           Filed March 17, 1942
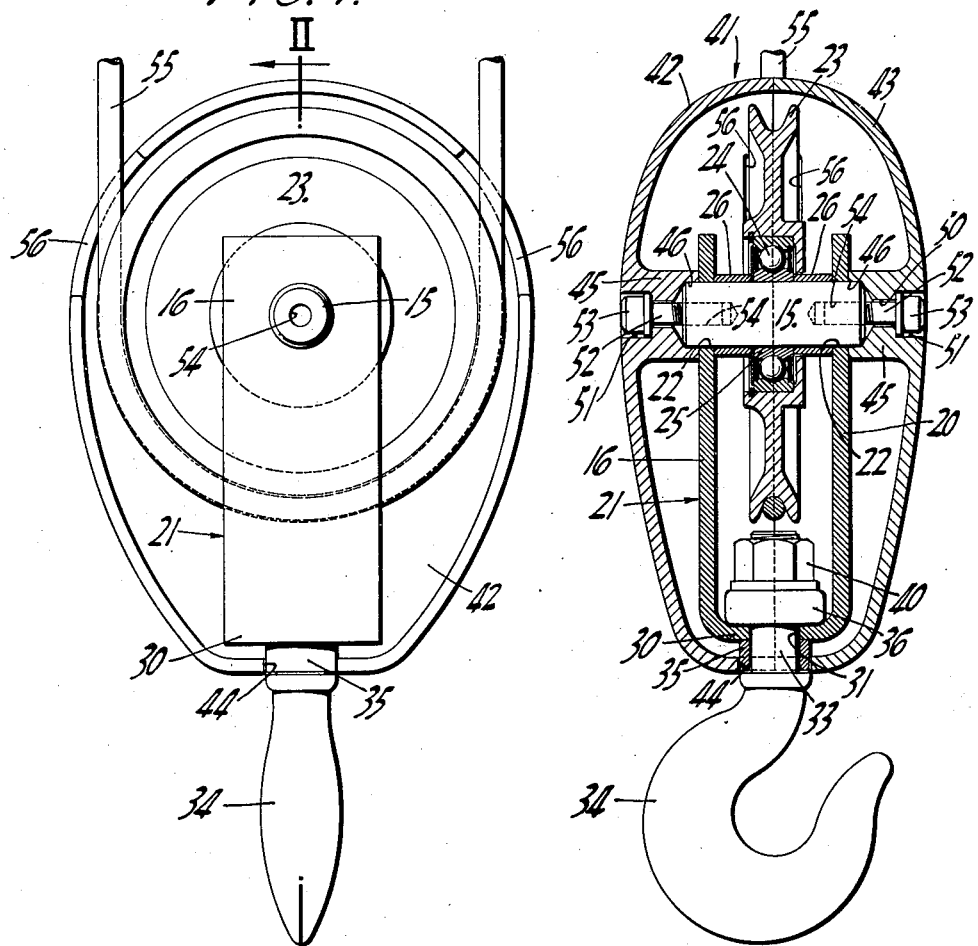
INVENTOR
CHARLES J. MANNEY
BY
Bean, Brooks, Buckley & Bean.
ATTORNEYS Patented Oct. 19, 1943

2,332,389

UNITED STATES PATENT OFFICE 2,332,389

HOOK BLOCK

Charles J. Manney, Kenmore, N. Y., assignor to Columbus McKinnon Chain Corp., Tonawanda, N. Y., a corporation of New York Application March 17, 1942, Serial No. 435,063

5 Claims. (Cl. 254—192)

My invention relates in general to hook blocks and particularly to a block for use in hoists having two-part rope reeving.

The principal object of my invention has been to provide a hook block having a casing which is supported independently of the mechanism of the block.

Another object has been to provide a block having casing parts which are supported by and held in registration with one another by means of the block shaft.

A further object has been to provide a block for use in connection with a cable hoist which may be easily and quickly assembled or disassembled when installing or removing a cable.

Moreover, my block is so designed that when being assembled the parts thereof will be centralized.

Furthermore, the fastening means of my block are flush with the casing thereof, thereby presenting a smooth, unbroken exterior.

The above objects and advantages have been accomplished by the device shown in the accompanying drawing, of which:

Fig. 1 is a side elevation of my complete device with one of the casing parts removed;

Fig. 2 is a fragmentary, sectional elevation taken on line II—II of Fig. 1; and, Fig. 3 is a reduced exterior side elevation of the complete block.

My device comprises a centrally arranged block shaft 15 which is supported by the upstanding arms 16 and 20 of the block yoke 21. The shaft passes through suitable apertures 22 formed in the upper ends of the upstanding arms and is slidably engaged therewith.

The sheave 23 of my device is mounted upon an anti-friction bearing 24 which is carried by the shaft 15. Spacing sleeves 26 are also mounted upon the shaft and are arranged on each side of the ball race 25 of the anti-friction bearing and the inner faces of the upstanding arms 16 and 20 of the yoke whereby the bearing 24 and the sheave 23 are kept centrally arranged with respect to the yoke.

The yoke is provided with a cross member 30 which joins the lower ends of the upstanding arms. This member is provided with an aperture 31 through which the neck 33 of the hook 34 extends. This neck is preferably elongated and passes through a sleeve 35 secured to the cross member 30 by any suitable means as, for instance, by welding.

An anti-friction bearing 36 is carried by the cross member 30 of the yoke and the neck 33 of the hook is extended therethrough. The upper end of the neck is screw-threaded and a nut 40 is carried thereby.

The casing 41 of my device is preferably made in two parts 42 and 43, the joint between these parts being so arranged that it passes through a plane located substantially midway the length of the shaft. A semi-circular recess 44 is formed in each of the casing parts at points where they come opposite the sleeve 35, whereby relative rotation of the parts is prevented.

Each of the casing parts is provided with a hub portion 45 having a shallow annular recess 46 in its inner end for the reception of one of the ends of the shaft 15, whereby the shaft ends form pilots for the casing parts. A concentric aperture 50 and a counterbore 51 are also provided in the hub 45 for the reception, respectively, of a screw 52 and its head 53. Each end of the shaft 15 is provided with a screw-threaded aperture 54 for the reception of one of the screws 52.

The shaft is of such length that when all the parts are assembled, as shown in Fig. 2, there will be a slight clearance between the ends of the shaft and the bottoms of the recesses 46, whereby all the parts will be firmly drawn together and centralized, as shown.

Obviously, the casing parts are rigidly held in position against lateral displacement by engagement with the shaft ends and against axial displacement by means of the two screws 52 as shown in Fig. 2. The sleeve 35 engaging with the semi-circular recesses in the casing parts serves to secure these parts against rotation about the shaft.

Each of the casing parts is provided with a recess 56 at points opposite the points where the cable 55 passes through the casing. Since these recesses open up into the surfaces at the joint between the casing parts, the cable will not interfere with the assembling or disassembling of these parts.

It is obvious from the foregoing that it is a relatively simple and easy matter to assemble my device when a cable is being installed. The cable is engaged with the groove of the sheave after which the shaft 15 is passed through the upstanding arms 16 and 20 of the yoke, the spacing sleeves 26 and the ball race 25. The casing parts are now engaged with the ends of the shaft with the recesses 44 in registerable positions with respect to the sleeve 35. The casing parts are now forced toward each other until their adjacent surfaces at the joint are brought substantially into contact, thereby centralizing all the parts. The screws 52 are now inserted in the screw-threaded apertures 54 in the shaft ends thereby drawing all parts firmly together and securing the casing parts in position. Obviously, when the cable is to be replaced, it is only necessary to remove the two screws 52, whereupon the casing parts may easily be removed. After the casing has been removed, the shaft may be moved axially to clear the ball race 25 thus allowing the sheave to be lifted out of the yoke. The old cable is then removed from the sheave and the new one installed after which the parts are assembled as hereinbefore described.

Obviously, some modifications of the details herein shown and described may be made without departing from the spirit of my invention or the scope of the appended claims, and I do not, therefore, wish to be limited to the exact embodiment herein shown and described, the form shown being merely a preferred embodiment thereof.

What I claim is:

1. A hook block, comprising a yoke, a hook supported by said yoke, a shaft supported solely by said yoke, a sheave carried by said shaft, and a casing for said block arranged exteriorly of said yoke for inclosing said yoke and said sheave, said casing being independent of said yoke and comprising two parts formed to have the joint therebetween arranged in a plane substantially at right angles to the shaft, said casing parts being removable independently of said shaft and means for securing the casing parts together.

2. A hook block, comprising a yoke, a hook supported by said yoke, a shaft supported solely by said yoke, a sheave carried by said shaft, and a casing for said block arranged exteriorly of said yoke for inclosing said yoke and said sheave, said casing being independent of said yoke and comprising two parts formed to have the joint therebetween arranged in a plane substantially at right angles to the shaft, said casing parts being registerable with said shaft and removable independently of said shaft, and means engageable with said shaft for securing said parts thereto.

3. A hook block, comprising a yoke, a hook supported by said yoke, a shaft supported solely by said yoke, a sheave carried by said shaft, a multi-part casing for said block arranged exteriorly of said yoke and inclosing said yoke and said shaft, said casing being separable independently of said shaft and said yoke, the ends of said shaft forming pilots for the support of said casing parts, and means for securing said casing parts to said shaft.

4. A hook block, comprising a yoke, a hook supported by said yoke, a shaft supported solely by said yoke and having its free ends projecting beyond said yoke, a sheave carried by said shaft, a two-part casing arranged exteriorly of said yoke for inclosing said yoke and said shaft, said casing being independent of said yoke and said shaft, each part formed with a recessed hub for engagement with one of the projecting ends of the shaft, and means engageable with said casing parts and said shaft for securing said parts in place.

5. A hook block, comprising a yoke, a hook supported by said yoke, a shaft supported solely by said yoke, a sheave carried by said shaft, a multi-part casing for said block arranged exteriorly of said yoke and inclosing said yoke and said shaft, said casing being separable independently of said shaft and said yoke, the free ends of said shaft forming pilots for said casing parts, each of said casing parts being formed with a recess for engagement with said hook, whereby to prevent rotation of the casing parts with respect to each other and with said hook, and means for securing said casing parts to said shaft.

CHARLES J. MANNEY.